United States Patent
Yang

(10) Patent No.: US 10,249,128 B1
(45) Date of Patent: Apr. 2, 2019

(54) MOBILITY DEVICE RENTAL SYSTEM

(71) Applicant: Guang Yu Yang, Wesley Chapel, FL (US)

(72) Inventor: Guang Yu Yang, Wesley Chapel, FL (US)

( * ) Notice: Subject to any disclaimer, the term of this patent is extended or adjusted under 35 U.S.C. 154(b) by 0 days.

(21) Appl. No.: 15/699,024

(22) Filed: Sep. 8, 2017

(51) Int. Cl.
G07F 17/00 (2006.01)
G06Q 10/02 (2012.01)
G07F 11/62 (2006.01)
G07F 11/00 (2006.01)
G07F 17/12 (2006.01)

(52) U.S. Cl.
CPC ......... G07F 17/0057 (2013.01); G06Q 10/02 (2013.01); G07F 11/002 (2013.01); G07F 11/62 (2013.01); G07F 17/12 (2013.01)

(58) Field of Classification Search
CPC ...... G07F 17/0057; G07F 17/12; G07F 11/62; G07F 11/002; G06Q 10/02
USPC ................................................. 235/381, 382
See application file for complete search history.

(56) References Cited

U.S. PATENT DOCUMENTS

| | | | | |
|---|---|---|---|---|
| 6,384,717 B1 * | 5/2002 | DeVolpi | ............. | B62H 3/02 194/205 |
| 7,748,511 B1 * | 7/2010 | Maher | .............. | G07F 17/32 194/205 |
| 9,418,345 B1 * | 8/2016 | Meehan | ............. | G06Q 10/02 |
| 2009/0174363 A1 * | 7/2009 | Maher | ............. | H02J 7/0027 320/107 |
| 2010/0089846 A1 * | 4/2010 | Navarro Ruiz | ..... | B60L 11/1833 211/4 |
| 2010/0228405 A1 * | 9/2010 | Morgal | ............. | B62H 3/02 701/2 |
| 2012/0191491 A1 * | 7/2012 | Choi | ............. | G06Q 10/02 705/5 |
| 2015/0356801 A1 * | 12/2015 | Nitu | ............. | G07C 9/00912 340/5.61 |
| 2018/0101179 A1 * | 4/2018 | Louey | ............. | G05D 1/0278 |

* cited by examiner

*Primary Examiner* — Paultep Savusdiphol
(74) *Attorney, Agent, or Firm* — Gulf Coast Intellectual Property Group

(57) ABSTRACT

A mobility device rental system that is operable to facilitate the rental of a plurality of mobility assistance devices. The mobility device rental system includes a plurality of rental terminals that are installed at publicly accessible locations. The rental terminals include at least one receiving stall so as to accommodate at least one wheelchair therein. A locking member is secured within the receiving stall so as to retain the mobility assistance device until rental thereof. An operating software is provided that is accessible via the Internet or software application wherein the operating software facilitates the rental process of a mobility assistance device. The rental terminals further include control tags configured to assist in tracking of the mobility assistance devices and maintaining an inventory thereof. The rental terminals include computing devices having graphical displays that are operable to facilitate the rental and return of a mobility assistance device.

18 Claims, 11 Drawing Sheets

MOBILITY DEVICE RENTAL SYSTEM

PRIORITY UNDER 35 U.S.C. Section 119(e) & 37 C.F.R. Section 1.78

This nonprovisional application claims priority based upon the following prior United States Provisional Patent Application entitled: Mobility Unit Rental System, Application No. 62/385,853: filed Sep. 9, 2016, in the name Guang Yu Yang of which is hereby incorporated by reference for all purposes.

FIELD OF THE INVENTION

The present invention relates generally to rental system for mobility devices, more specifically but not by way of limitation, a rental system that includes at least one rental terminal configured to facilitate the rental of at least one type of mobility device such as but not limited to a wheelchair wherein the rental terminal is configured to be located in a facility such as but not limited to an airport.

BACKGROUND

The population in the United States and many other developed countries is aging. The percentage of individuals living in the United States over the age of sixty-five is fifteen percent. The generation of people commonly known as the, baby-boomers, have a population size of approximately seventy-six million which represent almost a quarter of the total US population. As this generation of individuals begins to age, their health needs change. Various ailments and other conditions can begin to limit the physical mobility of the elderly. These individuals that have limited physical abilities will become dependent on mobility devices such as but not limited to wheelchairs to traverse from one location to another.

Obtaining access to a wheelchair or similar device for temporary use thereof is currently quite challenging. Conventional methods require an individual to make arrangement with a store such as a medical supply store to arrange for rental of a wheelchair. This typically requires reservations and additionally requires either delivery of the wheelchair or an additional trip to a location to retrieve the wheelchair. The process is time consuming and expensive. Many consumers find themselves in temporary need only for a mobility device such as a wheelchair and the aforementioned existing process for the acquisition of a wheelchair is less than ideal.

Accordingly, there is a need for a mobility device rental system that is configured to include at least one rental terminal located at a facility and a software application that is both Internet based and application based wherein the mobility device rental system facilitates the rental of at least one type of mobility unit to an individual.

SUMMARY OF THE INVENTION

It is the object of the present invention to provide a mobility device rental system that is operable to facilitate the entire rental process of a mobility unit that includes at least one rental terminal installed at a facility.

Another object of the present invention is to provide a mobility device rental system configured to store, dispatch and receive at least one type of personal mobility unit wherein the rental terminal includes an computing device with a graphical interface that is operably coupled to the Internet so as to be remotely accessible via a software application.

A further object of the present invention is to provide a mobility device rental system configured to provide rental of a device such as but not limited to a wheelchair wherein the rental system includes a retaining area that is configured to receive and store various sizes and types of personal mobility devices.

Still another object of the present invention is to provide a personal mobility device rental system configured to provide rental of a wheelchair or the like wherein the retaining area includes alternative embodiments having either a single or multiple stall members.

An additional object of the present invention is to provide a mobility device rental system configured to store, dispatch and receive at least one type of personal mobility unit wherein the retaining area includes embodiments configured to retain either single or multiple mobility devices.

Yet a further object of the present invention is to provide a mobility device rental system configured to provide rental of a device such as but not limited to a wheelchair wherein the retaining area is configured with a plurality of alternate locking devices configured to retain a personal mobility device within the retaining area.

Another object of the present invention is to provide a mobility device rental system configured to store, dispatch and receive at least one type of personal mobility device wherein the computing device operably coupled to the retaining area is configured to provide release of one mobility unit.

Still a further object of the present invention is to provide a mobility device rental system configured to provide rental of a mobility device such as but not limited to a wheelchair wherein the computing device is communicably coupled to a server having operating software thereon that provides operational functionality of the mobility device rental system to include but not be limited to inventory tracking, reservations and payment processing.

Yet a further object of the present invention is to provide a mobility device rental system configured to store, dispatch and receive at least one type of personal mobility device wherein the retaining area further includes a scanner or similar element that is able to identify the type of mobility unit being placed thereinto so as to direct the mobility device to the space of the retaining area for that type of mobility unit.

An alternative object of the present invention is to provide a mobility device rental system configured to provide rental of a device such as but not limited to a wheelchair wherein the retaining area includes rail members or similar elements that are operable to engage and retain a specific type of mobility device.

A further object of the present invention is to provide a personal mobility device rental system that further includes a software application configured to be loaded onto a device such as but not limited to a smartphone wherein the software application provides a user access to the mobility device rental system.

An additional object of the present invention is to provide a mobility device rental system wherein the rail members of the plurality of channels can include specialized guiding members to control the direction of a mobility device.

An alternative object of the present invention is to provide a mobility device rental system that is modular in construction so as to be adaptable to be placed in areas of different sizes and shapes.

A further object of the present invention is to provide a mobility device rental system configured to store, dispatch and receive at least one type of personal mobility device wherein the retaining area includes a plurality of gate members controlling access to mobility device spaces.

Yet another object of the present invention is to provide a mobility device rental system operable to facilitate the rental of alternate types of mobility devices that includes alternate embodiments of locking members communicably coupled to the computing device that is configured to release one mobility unit per transaction.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
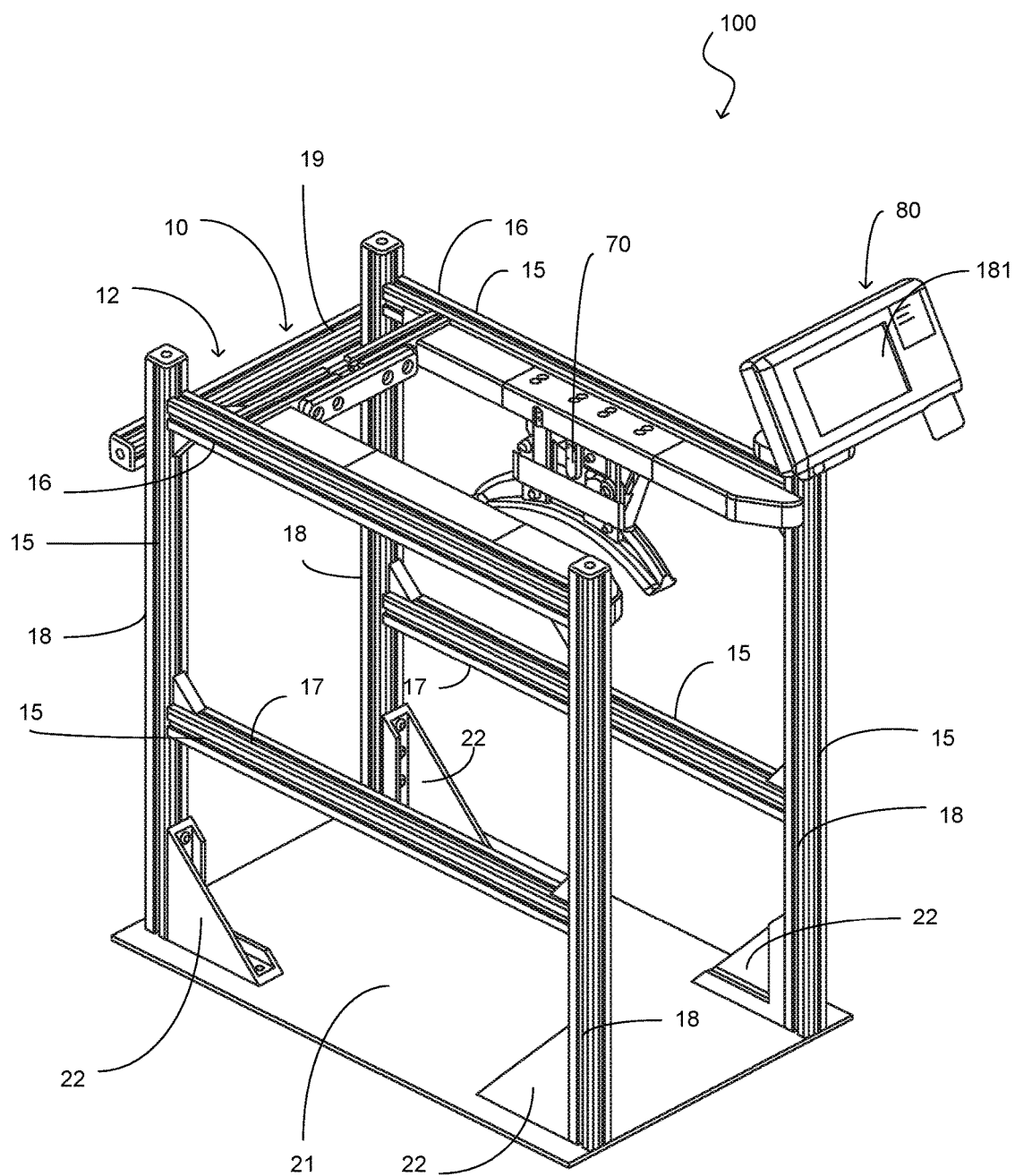
FIG. 1 is a perspective view of a rental terminal embodiment of the present invention.

Referring now to the drawings submitted herewith, wherein various elements depicted therein are not necessarily drawn to scale and wherein through the views and figures like elements are referenced with identical reference numerals, there is illustrated a mobility device rental system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
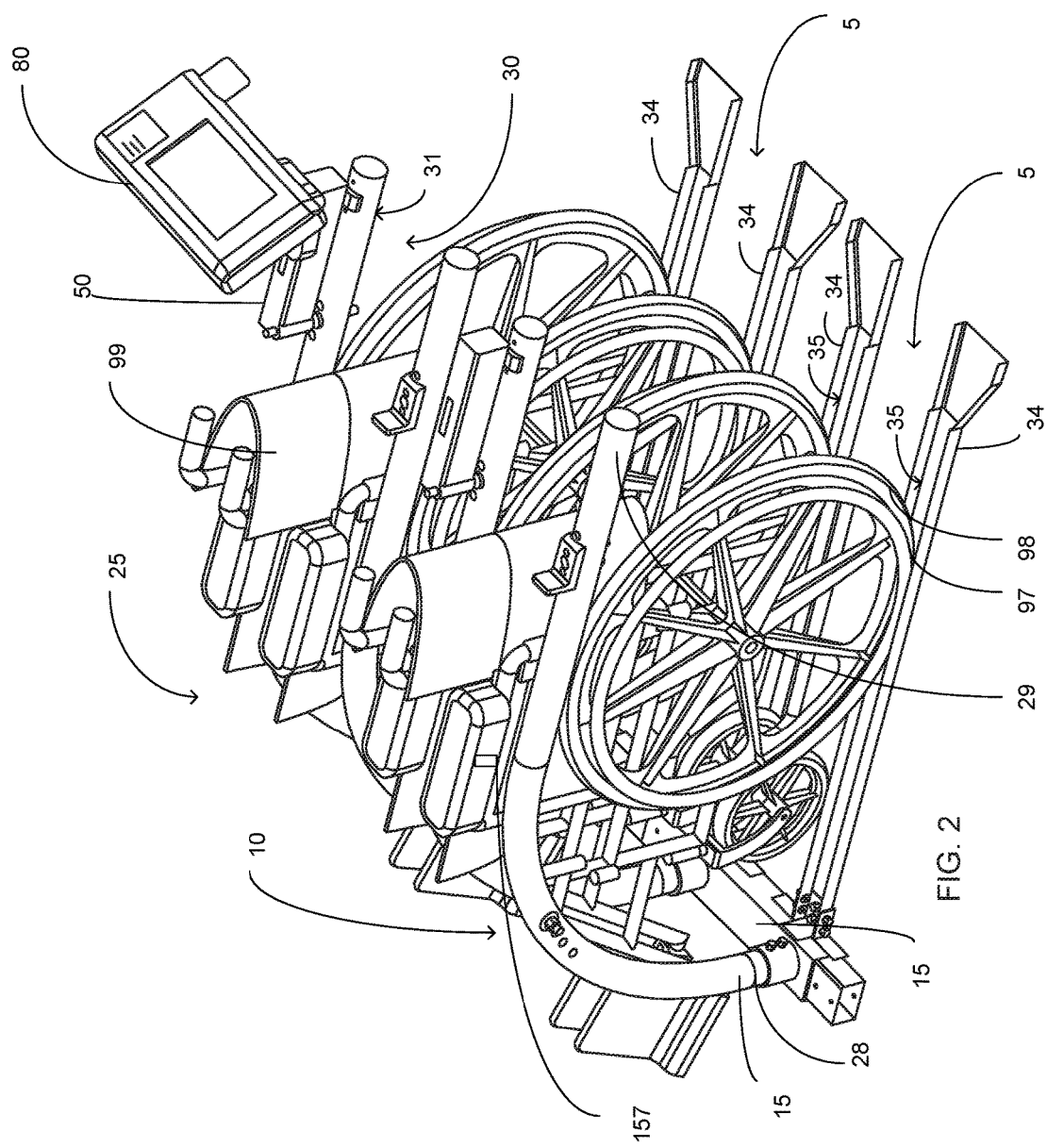
FIG. 2 is a perspective view of an alternate embodiment of a rental terminal of the present invention.
Figure 3:
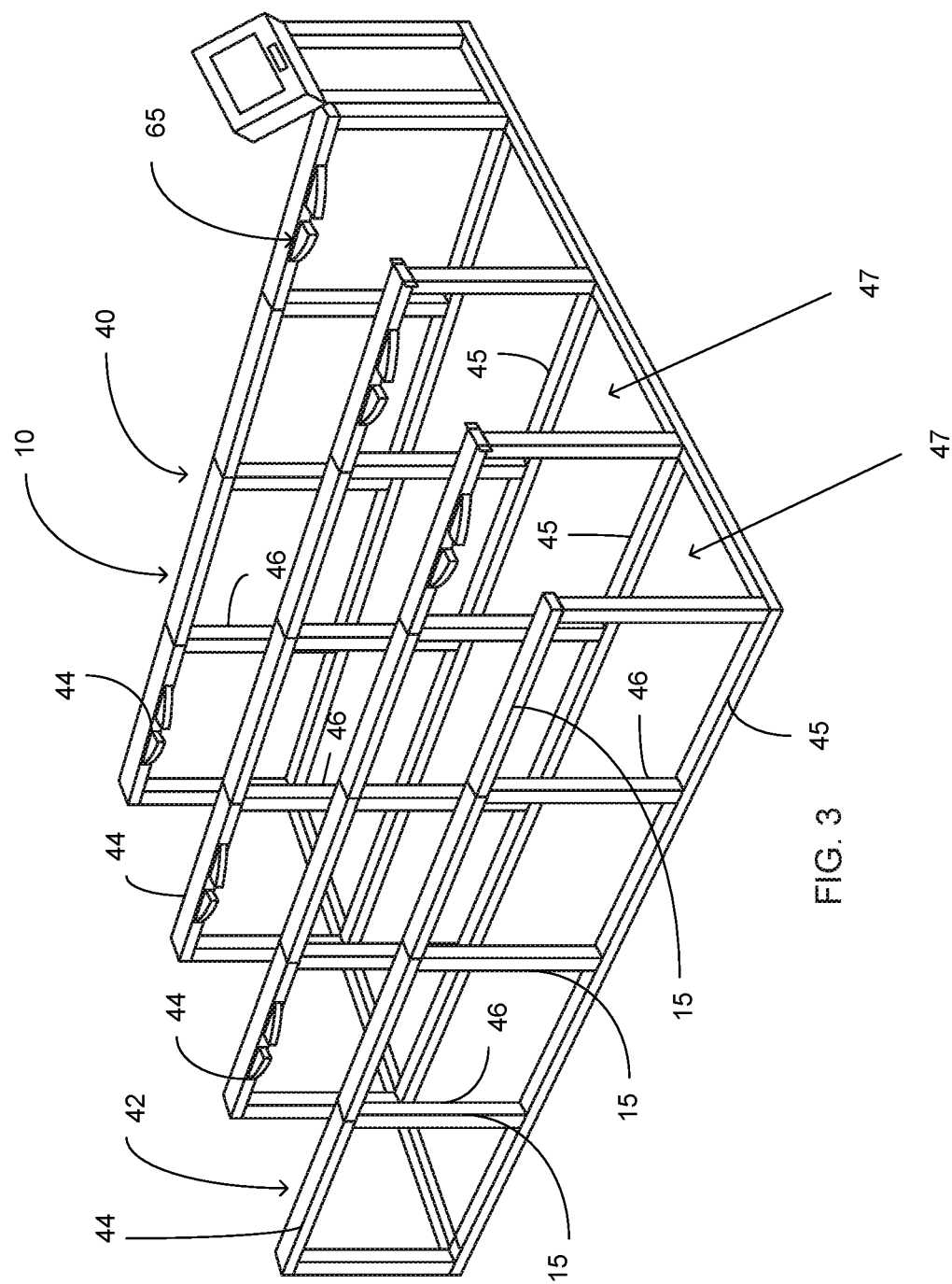
FIG. 3 is a perspective view of an alternate embodiment of a rental terminal of the present invention.

Referring in particular to FIGS. 1, 2 and 3 there are exemplary embodiments of the rental terminals 10 of the mobility device rental system 100 illustrated therein. The rental terminals 10 are assembled utilizing a plurality of frame members 15 and are configured to receive, store and dispense at least one exemplary mobility assistance device 99. The rental terminals 10 are provided to be placed in facilities such as but not limited to airports or shopping malls. As is shown in the embodiments illustrated herein, it is contemplated within the scope of the present invention that the rental terminals 10 could be formed in various shapes and sizes using alternate configurations of the frame members 15. The embodiments of the rental terminals 10 illustrated herein do not form a limitation on embodiments contemplated within the scope of the present invention but function to provide an understanding of the potential of alternate embodiments of the rental terminals 10.

Referring in particular to FIG. 1, the rental terminal 10 includes a frame 12 being comprised of a plurality of frame members 15. The rental terminal 10 includes upper longitudinal frame members 16 and lower longitudinal frame members 17 that are parallel in configuration. The frame 12 further includes corner support frame members 18 and upper horizontal frame member 19. Frame 12 further includes a base member 21 and a plurality of support brace members 22. The base member 21 and support brace members 22 are provided to ensure structural integrity of the rental terminal 10. It is contemplated within the scope of the present invention that the base member 20 and support brace members 22 could be provided in alternate embodiments or be absent in the construction of the frame 12. The frame 12 is assembled utilizing durable suitable techniques such as but not limited to mechanical fasteners or welding. While the rental terminal 10 illustrated in FIG. 1 is illustrated to have a capacity of one exemplary mobility assistance device 99, it is contemplated within the scope of the present invention that the rental terminal 10 could have a frame 12 that is configured to receive and retain more than one exemplary mobility assistance devices 99. The rental terminal 10 includes an embodiment of the locking device 70 and computing device 80, which are further discussed herein.

Referring in particular to FIG. 2, an alternative embodiment of the rental terminal 25 is illustrated therein. Rental terminal 25 includes upper frame members 26 that are secured to base frame member 27 utilizing suitable durable techniques. The upper frame members 26 include first end 28 and second end 29 with first end 28 being secured to base frame member 27. Upper frame members 26 are arcuate in shape and are configured to create receiving space 30 intermediate each upper frame member 26. The receiving space is sufficient in width so as to accommodate passage therethrough of an exemplary mobility assistance device 99. The upper frame member 26 is formed in a shape that creates a height wherein the lower surface 31 of the upper frame member 30 is superposed the wheel 98 of the exemplary mobility assistance device 99. This positioning of the upper frame member 26 functions to assist in maintaining the position of the exemplary mobility assistance device 99 once placed in receiving stall 5. The aforementioned positioning of the upper frame member 26 functions to substantially inhibit movement of the exemplary mobility assistance device 99 subsequent being placed in receiving stall 5. It is further contemplated within the scope of the present invention that the upper frame members 26 could be superposed the void intermediate the wheel 98 and the push ring 97 in order to accomplish the same objective of inhibiting movement of the exemplary mobility assistance device 99 subsequent being placed in a receiving stall 5. It is further contemplated within the scope of the present invention that all embodiments of the rental terminals 10 include a frame member 15 that is positioned similarly to the upper frame member 26 so as to inhibit movement of an exemplary mobility assistance device 99. Those skilled in the art will recognize that multiple alternate arrangements of frame members 15 could be employed to accomplish the desired stated objective. Rental terminal 25 further includes wheel guide members 34 that are formed to create channels 35 so as to receive and guide wheels 98 during placing of the exemplary mobility rental assistance device 99 in a receiving stall 5. It is contemplated within the scope of the present invention that the rental terminal 25 could have one or more than one wheel guide member 34 per receiving stall 5. Rental terminal 25 further includes a computing device 80 and gate member 50 that are further discussed herein.

Illustrated in FIG. 3 herein is an alternative embodiment of the rental terminal 40. Rental terminal 40 includes frame 42 being comprised of upper frame members 44, lower frame members 45, and vertical support frame members 46. The frame 42 is configured to have three receiving stalls 47 that are configured to receive a plurality of exemplary mobility assistance devices 99 therein. While the frame 42 is illustrated herein as having three receiving stalls 47, it is contemplated within the scope of the present invention that the rental terminal 40 could have as few as one receiving stall 47 or more than three receiving stalls 47 so as to accommodate the location where the mobility device rental system 100 is installed. The lower frame members 45 and upper frame members 44 are parallel in configuration and are operably coupled utilizing vertical support frame member 46. The frame 42 is assembled utilizing suitable durable techniques such as but not limited to mechanical fasteners. Rental terminal 40 further includes an embodiment of a locking member 65 and the computing device 80 that are further discussed herein. It should be understood within the scope of the present invention that while the rental terminals 10 are illustrated herein as being configured to receive and retain an exemplary mobility assistance device 99 that is a conventional wheelchair, that the rental terminals 10 could have alternate configurations of the frame so as to receive and retain additional types of wheeled devices.

Figure 6:
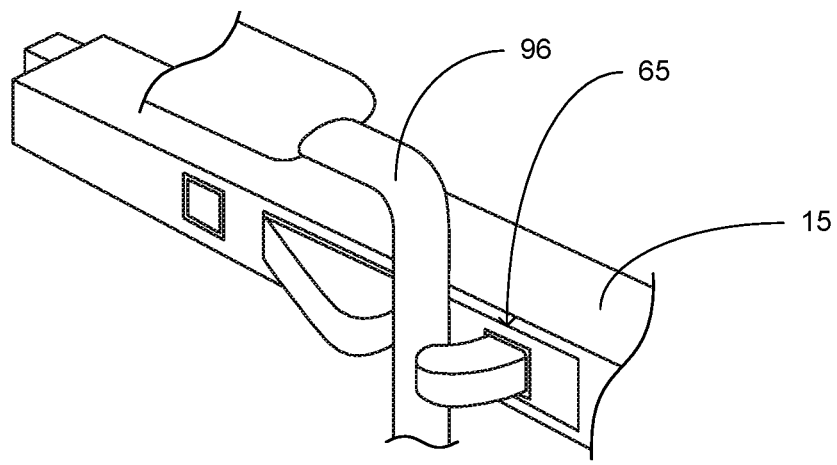
FIG. 6 is a detailed view of an embodiment of a locking member of the present invention.

The mobility device rental system 100 includes several embodiments of a locking member operable to assist in prevention of unauthorized removal of an exemplary mobility assistance device 99 from the rental terminals 10. Illustrated in FIG. 3 and FIG. 6 is an embodiment of the locking member 65. The locking member 65 functions to engage the arm rest support member 96 of the exemplary mobility assistance device 99. Locking member 65 includes first member 66 and second member 67 that are retractably secured into frame member 15. First member 66 and second member 67 are mounted so as to create receiving space 68 therebetween that is suitable in size so as to accommodate the arm rest support member 96. The first member 66 and second member 67 are retractably secured utilizing suitable durable techniques such as but not limited to spring mounting. It is contemplated within the scope of the present invention that the first member 66 and second member 67 could be retractably secured utilizing alternate techniques such as but not limited to electric motors. The first member 66 and second member 67 are movable intermediate a first position and a second position wherein in the first position the first member 66 and second member 67 are disposed within the frame member 15. In the second position, the first member 66 and second member 67 extend outward from the frame member 15 so as to releasably secure the arm rest support member 96 inhibiting movement of the exemplary mobility assistance device 99. It is contemplated within the scope of the present invention that the first member 66 and second member 67 of the locking member 65 could be formed in alternate sizes and shapes so as to accomplish the desired objective stated herein. The locking member 65 is operably coupled to the computing device 80 utilizing suitable techniques. The computing device 80 as will be further discussed herein, controls the movement of the locking member 65 intermediate its first position and second position during the rental process of an exemplary mobility assistance device 99.

Figure 4:
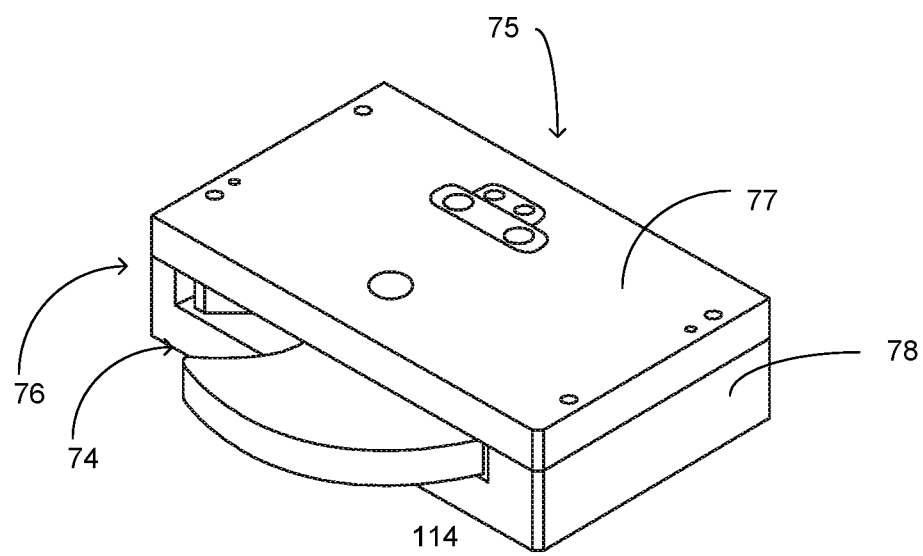
FIG. 4 is a detailed view of a locking member of the present invention.

Illustrated herein in FIG. 4 is locking member 75. Locking member 75 is configured to be operably coupled to frame member 15 utilizing suitable durable techniques. Locking member 75 includes base member 76 having a top member 77 and bottom member 78 operably coupled having a void(not illustrated herein) therebetween. Rotatably secured to base member 76 is disc 79. Disc 79 is rotatably secured utilizing suitable durable techniques and is rotatable intermediate a first position and a second position. Disc 79 includes notch 74 that is formed of a suitable size so as to receive a portion of the arm rest support member 96 therein. The disc 79 is operably controlled by a conventional electric motor or other similar techniques and further operably coupled to the computing device 80 so as to provide operation thereof. The disc 79 rotates intermediate a first position and a second position so as to inhibit and/or allow the removal of an exemplary mobility assistance device 99.

Figure 5:
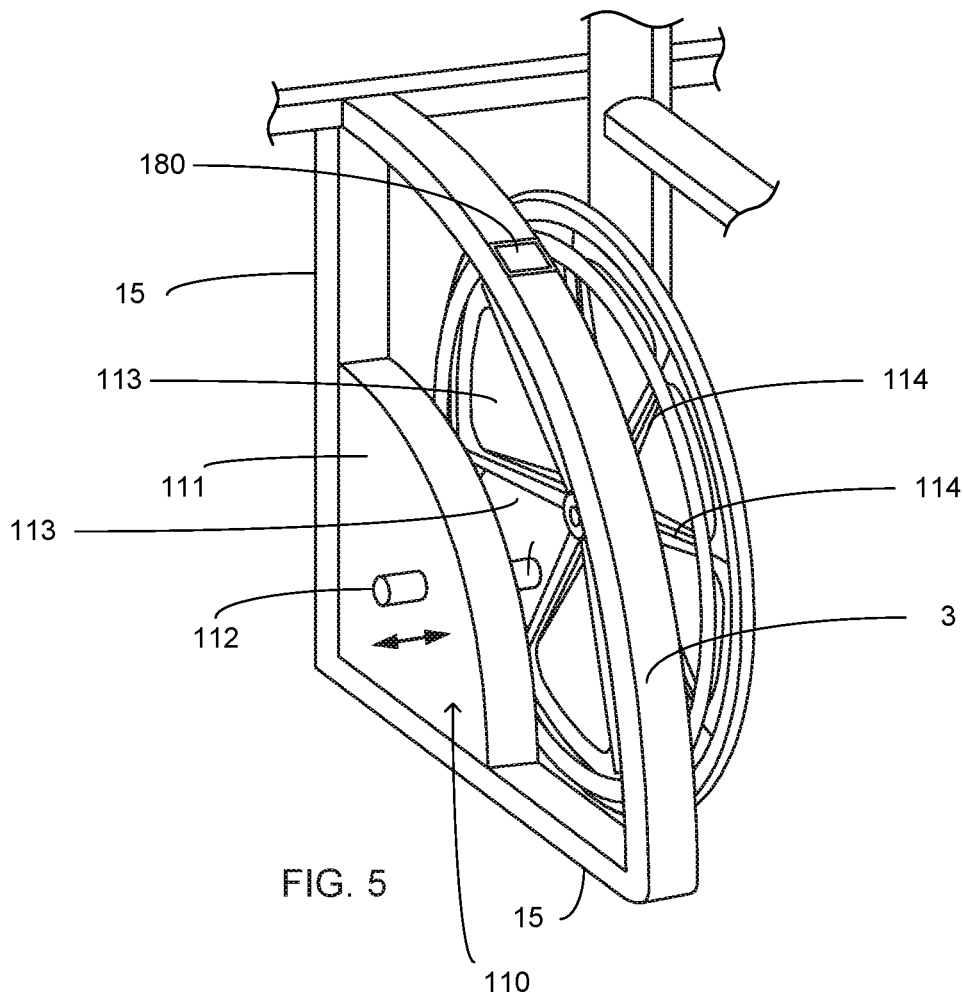
FIG. 5 is a detailed view of a rental terminal embodiment of the present invention.

Illustrated in FIG. 5 is an embodiment of a locking device 110. Locking device 110 includes base member 111 that is secured to frame members 15 utilizing suitable durable techniques. Base member 111 has movably mounted therein pins 112. Pins 112 are movably mounted within base member 111 utilizing suitable durable techniques such as but not limited to an electric motor. Pins 112 are movable intermediate a first position and a second position wherein in the first position pins 112 are retracted into base member 111. In the second position, pins 112 extend outward from base member 11 so as to penetrate into the void 113 intermediate the wheel spokes 114 of an exemplary mobility assistance device 99. The pins 112 extend a sufficient distance in the second position so as to inhibit removal of the exemplary mobility assistance device 99. The locking device 110 is operably coupled to a computing device 80 so as to provide control of the pins 112. While the base member 111 is illustrated in a particular form herein, it is contemplated within the scope of the present invention that the base member 111 could be manufactured in alternate sizes and shapes so as to mateably couple with frame members 15 and position the pins 112 properly so as to engage void 113. Further illustrated in FIG. 5 is indicator light 180. Indicator light 180 is integrally mounted into top frame member 3 and is operably coupled to computing device 180. Indicator light 180 functions to illuminate so as provide indication of which receiving stall 5 to remove the exemplary mobility assistance device 99. While not particularly illustrated herein, it is contemplated within the scope of the present invention that each receiving stall 5 could be configured with an indicator light 180.

Figure 11:
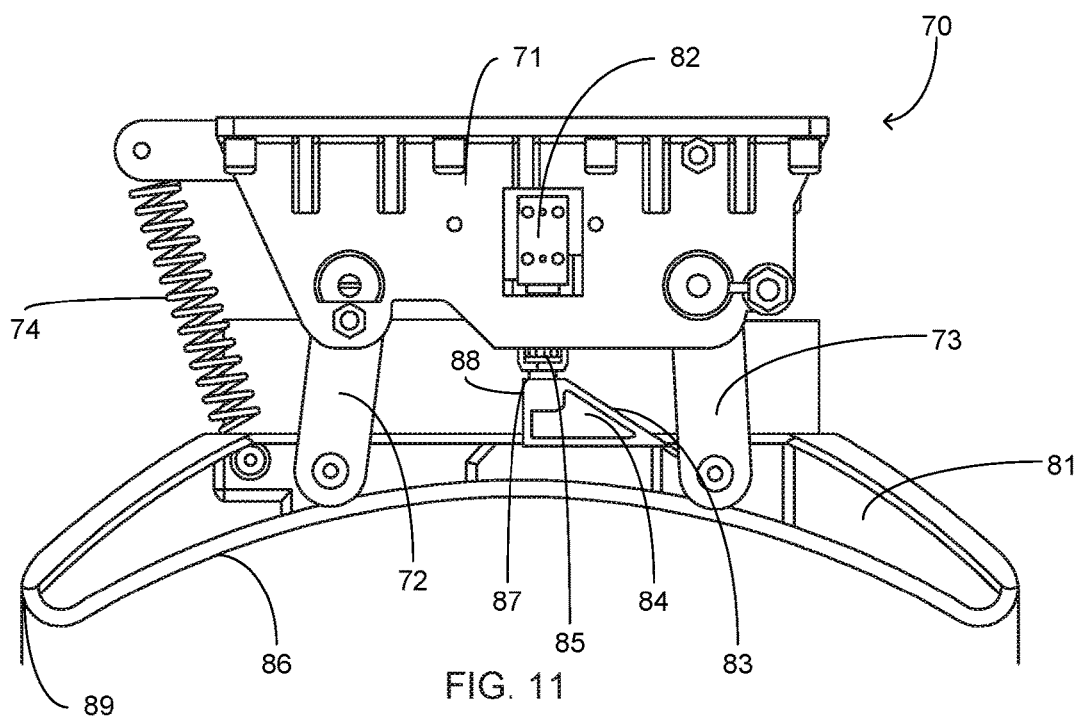
FIG. 11 is a detailed view of a locking member embodiment of the present invention.

Locking member 70 is illustrated in FIG. 11 herein. The locking member 70 functions to engage the wheel 98 of the exemplary mobility assistance device so as to retain in position within the receiving stall 5. The locking member 70 includes base member 71 that functions to facilitate the operable securing of the locking member 70 to the frame member 15 that is located at the top of the rental terminal 10. The base member 71 is manufactured from a suitable durable material and it is contemplated within the scope of the present invention that the base member 71 could be manufactured in alternate shapes and sizes in order to be mounted to the frame member 15 as illustrated in FIG. 1. Movably secured to the base member 71 is clamping member 81. Clamping member 81 is operable to engage wheel 98 so as to retain the exemplary mobility assistance device 98 within the receiving stall 5. Clamping member 81 includes a lower surface 86 that has a radius that is mateably equivalent to the radius of the wheel 98. Clamping member 81 pivotally mounted to the base member 71 via first mounting arm 72 and second mounting arm 73. The first mounting arm 72 and second mounting arm 73 provide an articulating motion of the clamping member 81 in order to provide either the release or the securing of the wheel 98. Spring 74 provides a bias for the aforementioned movement. Block 84 includes sloped surface 83 that is operable to slidably engage pin 87. Pin 87 is controlled by solenoid 82. As illustrated in FIG. 11, the pin 87 is in a locked position wherein the pin 87 is engaged with a groove or channel that is formed in the top portion 88 of the block 84. In the position illustrated in FIG. 11, the wheel 98 is immovable in a backwards-forwards motion so as to retain the exemplary mobility assistance device 99 within the receiving stall 99. During release of the exemplary mobility assistance device 99, the pin 87 is retracted by solenoid 82 sufficiently so as to disengage from the top portion 88 of the block 84 and traverse down sloped surface 83. During this motion spring 74 provides a bias to lift end 89 upwards thereby releasing the exemplary mobility assistance device 99. During the process of loading an exemplary mobility assistance device 99 the opposing action occurs wherein the wheel 98 will engage the lower surface 86 and move the clamping member 81 such that pin 87 traverses upward along sloped surface 83 until reaching top portion 88 and subsequently penetrate a channel or a depression so as to lock the pin 87 in place on the top portion 88. It is contemplated within the scope of the present invention that the clamping member 81 could be movably controlled via alternate techniques so as to accomplish the desired objective of movably controlling the clamping member 81 so as to engage wheel 98 for the purpose of retaining the exemplary mobility assistance device 99 within receiving stall 5.

Figure 7:
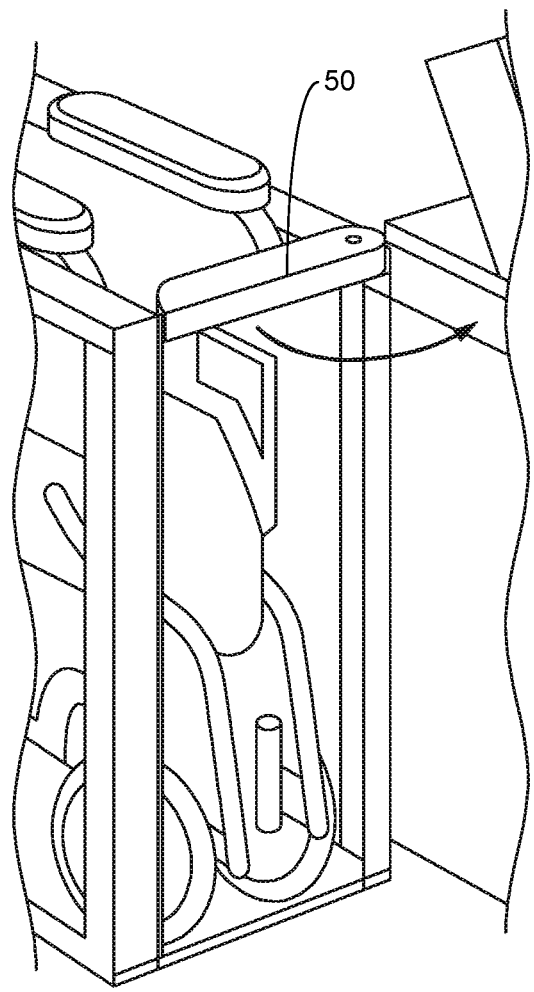
FIG. 7 is a detailed view of a rental terminal embodiment of the present invention.
Figure 10:
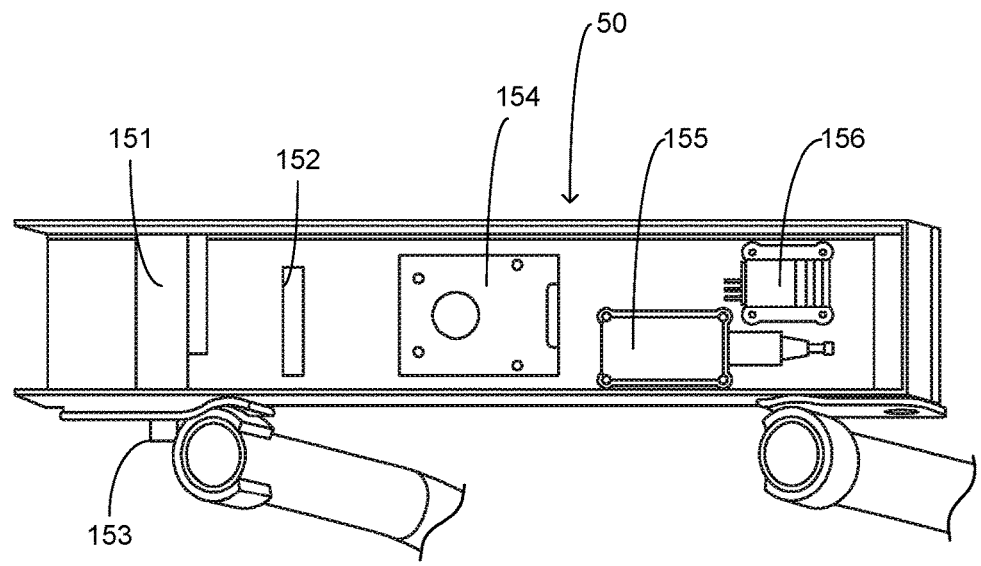
FIG. 10 is a detailed view of a gate member of the present invention.

Illustrated in FIG. 10 herein is a detailed view of gate member 50. Gate member 50 is operable to provide a controlled access to receiving stall 5 as shown in particular in FIG. 2 herein. The gate member 50 is movably mounted so as to operate in a pendulum or swing motion so as to provide access to an exemplary mobility assistance device 99 disposed in a receiving stall 5. The gate member 50 is operably coupled to the computing device 80. The gate member 50 includes a solenoid 151 and locking pin 153 that are operable to maintain the gate member 50 in a closed position. A light 152 is present to provide visual indication to a user as to which gate member 50 will be unlocked during rental of an exemplary mobility assistance device 99. Light 152 illuminates during the rental process ensuing engagement of the computing device 80 by a user so as to indicate which gate member 50 to move or will be moved through automated techniques allowing access to the receiving stall 5. A control tag 154 is also integrated into the gate member 50. The control tag 154 is configured to be communicably coupled to the computing device 80 and a second control tag 157 located on the exemplary mobility assistance device 99. Control tag 154 and second control tag 157 provide the function of identification of the specific exemplary mobility assistance device 99. This is useful when rental terminals 10 are configured to dispense more than one exemplary mobility assistance device 99. Further the second control tag 157 has associated therewith data such as but not limited to type and configuration of exemplary mobility assistance device 99 that permits computing device 80 to facilitate an appropriate rental based on need. The gate member 50 further includes a wifi module 155 and electronic relay 156 that are communicably coupled to the computing device 80 so as to facilitate the aforementioned desired tasks. While the gate member 50 is illustrated herein as being rectangular in shape, it is contemplated within the scope of the present invention that the gate member 50 could be formed in alternate shapes and mounted using alternate techniques. By way of example but not limitation, FIG. 7 herein illustrated a gate member 50 manufactured having the aforementioned elements wherein the gate member 50 is mounted utilizing an alternate technique.

Figure 9:
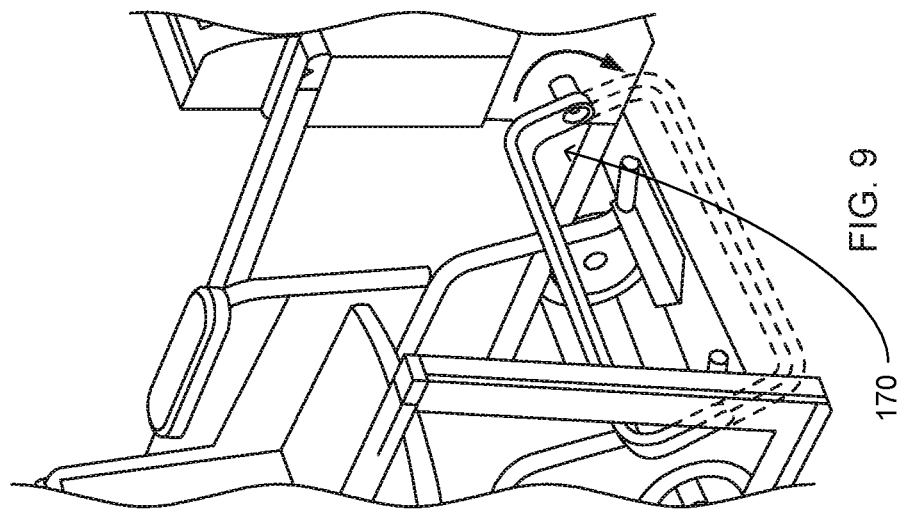
FIG. 9 is a detailed view of a rental terminal embodiment of the present invention.
Figure 8:
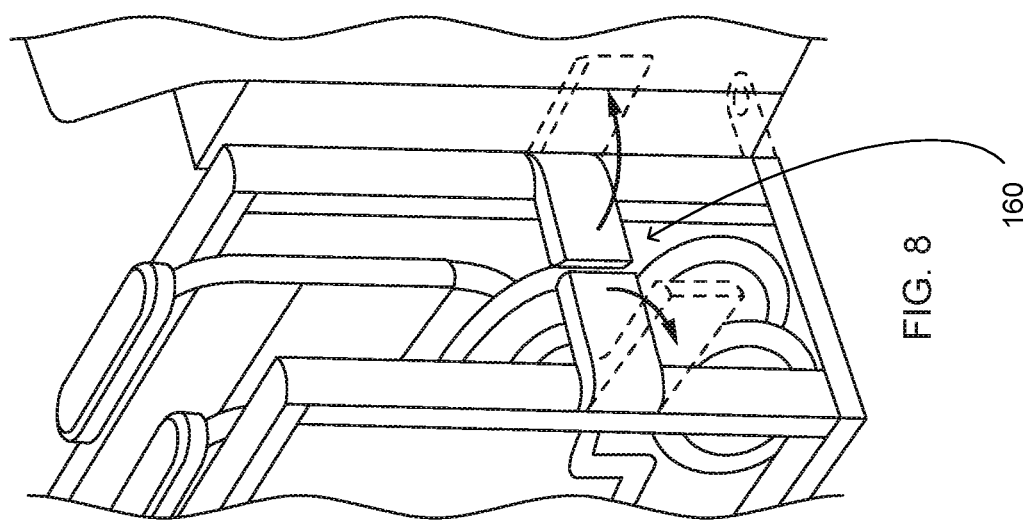
FIG. 8 is a detailed view of a rental terminal embodiment of the present invention.

A second embodiment of the gate member 160 is illustrated in FIG. 8 and a third embodiment of the gate member 170 is illustrated in FIG. 9. Gate member 160 and gate member 170 are exemplary and do not function to limit the embodiments of the gate member 50. Gate member 160 and gate member 170 function similarly to gate member 50 providing controlled access to receiving stall 5. It is contemplated within the scope of the present invention that numerous alternate embodiments of the gate member 50 could be provided being operable to provide controlled access to the receiving stall 5.

Each rental terminal 10 is equipped with a computing device 80. The computing device 80 is a conventional computing device that includes the necessary electronics to receive, store, manipulate and transmit data. The computing device 80 is powered by a conventional power supply and includes a graphical display 181 that is configured to facilitate utilization of operating software operable to assist a user during rental of an exemplary mobility assistance device 99. The computing device 80 is configured with an operating software that is operable to execute tasks such as but not limited to identifying an available exemplary mobility assistance device 99, receiving payment for a rental, facilitating return of a rental, receiving a reservation for a rental, tracking the location and identity of an exemplary mobility assistance device 99 and maintaining an updated inventory. It is contemplated within the scope of the present invention the computing device 80 is further wirelessly coupled to a server via conventional protocols so as to facilitate the rental process from a remote location such as but not limited to a website or software application on a smart phone or tablet PC.

Figure 12:
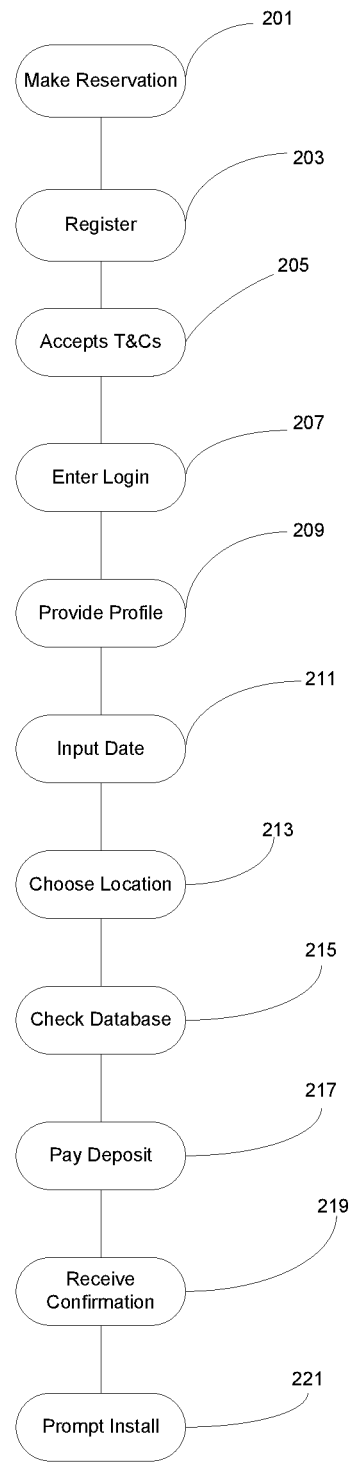
FIG. 12 is a flowchart of the reservation process of the present invention.

Referring now to FIG. 12, the reservation process of the mobility device rental system 100 is outlined therein wherein a user is executing the rental process from a remote destination. In step 201, a user initiates the reservation process by accessing a website, utilizing a software application or by contacting a call center. Step 203, the user is provided the option of continuing the reservation as a registered user or as a guest. In step 205, the user is present with the terms and conditions governing the rental process and must provide acceptance thereof. Step 207, the user is presented with an option to enter a previously assigned login information if the user has previously registered with the mobility device rental system 100. In step 209, a user will provide profile information such as but not limited to name, phone number and email to create a user profile if a user chooses to proceed with registration and not as a guest in order to continue with a rental. Step 211, a user will input data such as but not limited to date, time and location for pickup/return of an exemplary mobility assistance device 99. In step 213, the user will choose from a provided list available rental locations that fulfill the inputted data criteria from step 211. Step 215, a reservation is finalized wherein the operating software of the mobility device rental system 100 executes verification of the inventory to ensure requirements of the rental request can be completed. In step 217, a user will submit payment for a deposit of the rental so as to confirm the reservation and hold the selected exemplary mobility assistance device 99. Step 219, the mobility device rental system 100 will transmit a confirmation code utilizing suitable communication protocols such as but not limited to SMS text or email. In step 221, if a user executed the rental process as a guest, the user will be prompted to become a registered user and install the software application of the mobility device rental system 100 onto a mobile computing device.

Figure 13:
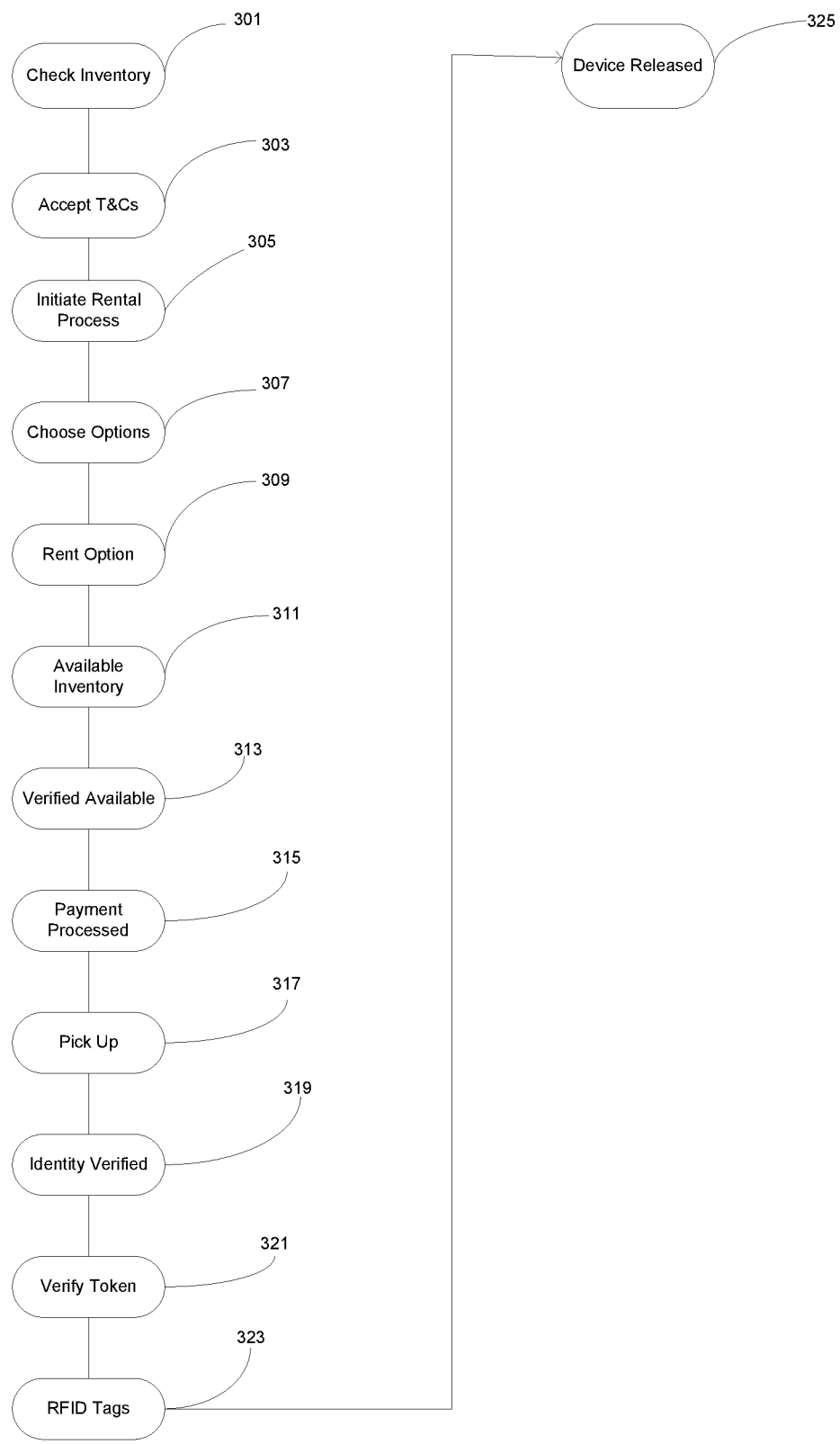
FIG. 13 is a flowchart of the rental terminal process of the present invention.

Referring in particular to FIG. 13, an outline of the rental process being executed at the rental terminal 10 via the computing device 80 is outlined therein. In step 301, the computing device 80 will check inventory for the rental terminal 10 to which it is physically attached and additionally check inventory at rental terminals 10 proximate thereto. Step 303, the computing device 80 will prompt the user to accept the terms and conditions of using the mobility device rental system 100. In step 305, the user will initiate the rental process. Step 307, the computing device 80 will display rental options to the user that include but are not limited to rent now, pick up reservation or use prepaid token. In step 309, a user will select the rent now option. Step 311, the computing device 80 will verify the available inventory at the rental terminal 10 and cross-reference with the reservation database stored in a server computer of the mobility device rental system 100. In step 313, the computing device 80 will verify that an exemplary mobility assistance device 99 is available at the rental terminal 10. If an exemplary mobility assistance device 99 is not available at the present rental terminal 10, the mobility device rental system 100 will provide an inventory check of any rental terminals 10 proximate thereto and provide directions to proceed to that rental terminal 10 to complete rental. In step 315, provided an exemplary mobility assistance device 99 is available, the mobility device rental system 100 will facilitate the acceptance of payment via techniques such as but not limited to currency or credit card. Upon receipt of payment, the selected exemplary mobility assistance device 99 is released from the receiving stall 5 so as to be taken by the user. Step 317, if a user has arrived at a rental terminal to pick up a reserved exemplary mobility assistance device 99, the user will be prompted to enter the confirmation code provided by the mobility device rental system 100 during the reservation process. In step 319, the confirmation code is verified by the computing device 80 and the correct exemplary mobility assistance device 99 is released to the user. In step 321, if a user is utilizing a prepaid token, the computing device 80 will verify the prepaid token for acceptance of payment for the rental of the exemplary mobility assistance device 99. In step 323, the computing device will verify the rental of the selected exemplary mobility assistance device 99 through reading of data stored on the second control tag 157. Step 325, ensuing verification of the data from the second control tag 157, the exemplary mobility assistance device 99 is released to the user.

Figure 14:
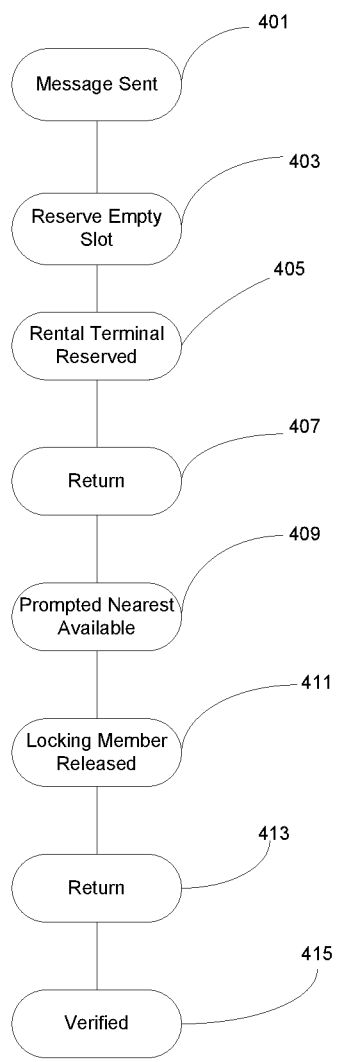
FIG. 14 is a flowchart of the return process of the present invention.

Referring to FIG. 14, an overview of the return process of an exemplary mobility assistance device 99 is outlined therein. In step 401, the user is sent a message to remind the user that the rental period for the rented exemplary mobility assistance device 99 is about to expire. Step 403, the user will access the mobility device rental system 100 via the operating software thereof to reserve an empty receiving stall 5 at a desired rental terminal 10. Step 405, the user may be provided the rental terminal 10 from which the exemplary mobility assistance device 99 was rented as the required rental terminal 10 to return the exemplary mobility assistance device 99. In step 407, the user may proceed to any rental terminal 10 at the end of the rental time period in order to return the exemplary mobility assistance device 99. Step 409, if the user has arrived at a rental terminal 10 wherein there are no available receiving stalls 5, the computing device 80 will provide directions to the closest rental terminal 10 that has an available receiving stall 5 and reserve for the user to return the exemplary mobility assistance device 99. In step 411, the locking member 70 is moved to a position so as to facilitate the insertion of the exemplary mobility assistance device 99 into the receiving stall 5 designated for the return of the exemplary mobility assistance device 99. Step 413, ensuing deposit of the exemplary mobility assistance device 99 into the receiving stall 5, the locking member 70 is moved to a position wherein the exemplary mobility assistance device 99 is retained in the receiving stall 5 so as to inhibit removal thereof until a subsequent rental. In step 415, the computing device 80 communicates with the second control tag 157 so as to obtain the information of the returned exemplary mobility assistance device 99 and provides an update to an inventory stored on a server database of the mobility device rental system 100 so as to make the returned exemplary mobility assistance device 99 available for another rental.

Figure 15:
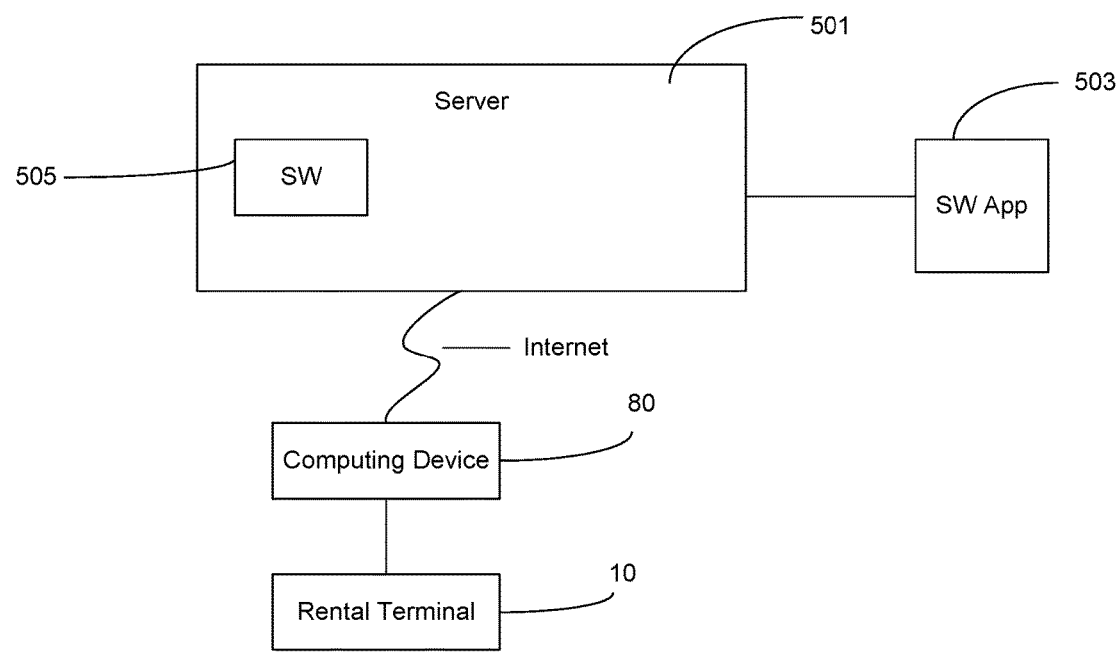
FIG. 15 is schematic diagram of the operational elements of the present invention.

Referring to FIG. 15 herein, a schematic diagram of the operational components is illustrated therein. The mobility device rental system 100 includes a server computer 501 having the necessary electronics to store, receive, transmit and manipulate data. The server computer 501 has operating software 505 stored thereon that is accessible via conventional techniques such as but not limited to a web browser on a computing device. A software application 503 is further provided wherein the software application is loaded onto a mobile computing device such as but not limited to a smart phone. The server computer 501 is communicably coupled via the Internet or other suitable communication protocol to the computing device 80 that is secured to the rental terminal 10.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A mobility device rental system that is operable to facilitate the rental of at least one mobility assistance device comprising:
    at least one rental terminal, said at least one rental terminal having a frame, said frame having a plurality of frame members, said frame further including a plurality of brace members, said brace members structurally integrated with said plurality of frame members, said frame members being secured to each other so as to create at least one receiving stall, said at least one receiving stall being configure to receive and retain at least one mobility assistance device, said at least one rental terminal having a first control tag, said first control tag being communicably coupled to a second control tag, said second control tag be secured to said at least one mobility assistance device, said first control tag configured to obtain identification information from the second control tag concerning the at least one mobility assistance device;
    a computing device; said computing device operably coupled to said at least one rental terminal, said computing device having a graphical display, said computing device having the necessary electronics to receive, store, transmit and manipulate data, said computing device providing an interface to facilitate rental of the at least one mobility assistance device;
    an operating software, said operating software accessible to a user utilizing a software application on a computing device or via a website, said software application operable to facilitate a rental process for the at least one mobility assistance device;
    a locking member, said locking member operable to retain the at least one mobility assistance device in said at least one receiving stall, said locking member configured to retain said at least one mobility assistance device within said at least one receiving stall until said at least one mobility assistance device has been rented, said locking member configured to engage a portion of a wheel of the at least one mobility assistance device.

2. The mobility device rental system as recited in claim 1, wherein said locking member further includes a base member, said base member configured to be secured to one of said plurality of frame members, said locking member further including a clamping member, said clamping member being arcuate in shape having a radius similar to that of the wheel of the at least one mobility assistance device, said clamping member movably coupled to said base member, said clamping member configured to be superposed a wheel of the at least one mobility assistance device so as to retain the mobility assistance device within said at least one receiving stall.

3. The mobility device rental system as recited in claim 2, wherein at least two of said plurality of frame members are configured to be superposed wheels of the mobility assistance device so as to assist in the alignment and retention of the mobility assistance device within the at least one receiving stall.

4. The mobility device rental system as recited in claim 3, and further including an indicator light, said indicator light being operably coupled to said computing device, said indicator light installed in a top portion of the frame of the at least one receiving stall, said indicator light configured to provide notification to a user as to which of the at least one receiving stall a mobility assistance device can be retrieved or returned.

5. The mobility device rental system as recited in claim 2, wherein said locking member further includes a first mounting arm and a second mounting arm, said first mounting arm and said second mounting arm being pivotally secured to said base member and said clamping member.

6. The mobility device rental system as recited in claim 5, wherein said locking member further includes a block, said block being secured to said clamping member, said block having a sloped upper surface, said locking member including a solenoid operated pin, said solenoid operated pin configured to engage said block so as to facilitate locking of the clamping member into a position superposed on a wheel of the mobility assistance device.

7. The mobility device rental system as recited in claim 6, wherein the at least one mobility assistance device is a wheelchair.

8. A mobility device rental system that is operable to facilitate the rental of a plurality of mobility assistance devices comprising the steps of:
    providing an operating software, said operating software configured to facilitate a rental process of a mobility assistance device, said operating software being provided on a server computer or a mobile computing device, wherein the operating software functions to maintain an inventory of the mobility assistance devices;
    providing a plurality of rental terminals, said plurality of rental terminals having a frame, said frame having a plurality of frame members, said frame further including a plurality of brace members, said brace members structurally integrated with said plurality of frame members, said frame members being secured to each other so as to create at least one receiving stall, said at least one receiving stall being configure to receive and retain a plurality of mobility assistance devices, said plurality of rental terminals having a first control tag, said first control tag being communicably coupled to a second control tag, said second control tag be secured to said plurality of mobility assistance devices, said first control tag configured to obtain identification information from the second control tag concerning the plurality of mobility assistance devices;

providing a plurality of locking members, said locking members being disposed in said at least one receiving stall, said plurality of locking members further including a wheel engagement member, said wheel engagement member configured to engage a portion of a wheel of a mobility assistance device, said locking members configured to retain the plurality of mobility assistance devices within the at least one receiving stall;

accessing the mobility device rental system, wherein a user accesses the mobility device rental system utilizing the operating software;

inputting a date and time for a desired rental of a mobility assistance device;

providing at least one location of a rental terminal that has an available mobility assistance device on the requested date and time;

facilitating collection of a deposit for the rental of the mobility assistance device;

providing a rental confirmation code;

proceeding to the rental terminal;

entering the confirmation code, wherein the confirmation code is entered onto a computing device, said computing device operably coupled to said rental terminal, said computing device having a graphical display, said computing device having the necessary electronics to receive, store, transmit and manipulate data, said computing device providing an interface to facilitate rental of the mobility assistance device;

illuminating a receiving stall, said illuminating a receiving stall being accomplished by an indicator light, said indicator light being mounted to a frame member adjacent to said receiving stall, said indicator light being operably coupled to said rental terminal, said indicator light having a first mode and a second mode, said first mode of said indicator light said indicator light is turned off, said second mode of said indicator light said indicator light is illuminated, said second mode of said indicator light operable to identify the receiving stall to retrieve or return a mobility assistance device;

releasing a locking member, said locking member operable to retain the mobility assistance device in the receiving stall;

removing the mobility assistance device from the receiving stall;

utilizing the mobility assistance device; and returning the mobility assistance device subsequent use thereof.

9. The mobility device rental system as recited in claim 8, and further including the step of providing notification of rental expiration, wherein the operating software provides an electronically delivered message to a renter of a mobility assistance device prior to end of a rental time period.

10. The mobility device rental system as recited in claim 9, wherein said locking members further includes a base member, said base member configured to be secured to one of said plurality of frame members, said locking member further including a clamping member, said clamping member having a lower surface that is arcuate in shape, said clamping member movably coupled to said base member, said clamping member having a first end and a second end, said clamping member configured to be superposed a wheel of the plurality of mobility assistance devices so as to retain the mobility assistance devices within said at least one receiving stall.

11. The mobility device rental system as recited in claim 10, and further including the step of directing a user to a rental terminal proximate thereto, said directing a user being delivered upon a lack of availability of spaces to return a mobility assistance device or lack of availability of mobility assistance devices for rental.

12. The mobility device rental system as recited in claim 11, wherein said first control tag and said second control tag are operably coupled to the computing device, said first control tag and said second control tag configured to track and inventory the plurality of mobility assistance devices.

13. The mobility device rental system as recited in claim 12, and further including the step of updating the inventory, said updating the inventory occurring subsequent a rental of a mobility assistance device and a return of a mobility assistance device.

14. A mobility device rental system that is operable to facilitate the rental of a plurality of mobility assistance devices comprising the steps of:

providing an operating software, said operating software configured to facilitate a rental process of a mobility assistance device, said operating software being provided on a server computer or a mobile computing device, wherein the operating software functions to maintain an inventory of the mobility assistance devices;

providing a plurality of rental terminals, said plurality of rental terminals having a frame, said frame having a plurality of frame members, said frame further including a plurality of brace members, said brace members structurally integrated with said plurality of frame members, said frame members being secured to each other so as to create at least one receiving stall, said at least one receiving stall being configure to receive and retain a plurality of mobility assistance devices, said plurality of rental terminals having a first control tag, said first control tag being communicably coupled to a second control tag, said second control tag be secured to said plurality of mobility assistance devices, said first control tag configured to obtain identification information from the second control tag concerning the plurality of mobility assistance devices;

installing the plurality of rental terminal in public accessible facilities;

providing a plurality of locking members, said locking members being disposed in said at least one receiving stall, said locking members configured to retain the plurality of mobility assistance devices within the at least one receiving stall, wherein said locking members further includes a base member, said base member configured to be secured to one of said plurality of frame members, said locking member further including a clamping member, said clamping member having a lower surface that is arcuate in shape, said lower surface having a radius that is similar to that of a wheel of the mobility assistance device, said clamping member movably coupled to said base member, said clamping member having a first end and a second end, said clamping member configured to be superposed a wheel of the plurality of mobility assistance devices so as to retain the mobility assistance devices within said at least one receiving stall;

accessing the mobility device rental system, wherein a user accesses the mobility device rental system utilizing the operating software;

inputting a date and time for a desired rental of a mobility assistance device;

verifying an inventory of mobility assistance devices stored in the plurality of rental terminals;

providing at least one location of a rental terminal that has an available mobility assistance device on the requested date and time;

facilitating collection of a deposit for the rental of the mobility assistance device;

proceeding to the rental terminal;

accessing a computing device, said computing device operably coupled to said rental terminal, said computing device having a graphical display, said computing device having the necessary electronics to receive, store, transmit and manipulate data, said computing device providing an interface to facilitate rental of the mobility assistance device;

verifying availability of a mobility assistance device for rental;

collecting payment for rental of the mobility assistance device;

illuminating a receiving stall, said illuminating a receiving stall being accomplished by an indicator light, said indicator light being mounted to a top portion of a frame member adjacent to said receiving stall, said indicator light configured to provide notification to a user as to which of the at least one receiving stall a mobility assistance device can be retrieved or returned;

releasing a locking member, said locking member operable to retain the mobility assistance device in the receiving stall;

removing the mobility assistance device from the receiving stall;

utilizing the mobility assistance device;

providing notification of rental expiration, wherein the operating software provides an electronically delivered message to a renter of a mobility assistance device prior to end of a rental time period; and returning the mobility assistance device subsequent use thereof.

15. The mobility device rental system as recited in claim 14, and further including the step of reserving a mobility assistance device for rental, said reserving the mobility assistance device subsequent collection of the deposit.

16. The mobility device rental system as recited in claim 15, and further including the step of updating the inventory, said updating the inventory occurring subsequent a rental of a mobility assistance device and a return of a mobility assistance device.

17. The mobility device rental system as recited in claim 16, wherein said locking members further includes a block, said block being secured to said clamping member, said block having a sloped upper surface, said locking member including a solenoid operated pin, said solenoid operated pin configured to engage said block so as to facilitate locking of the clamping member into a position superposed on a wheel of the mobility assistance device.

18. The mobility device rental system as recited in claim 17, and further including the step of directing a user to a rental terminal proximate thereto, said directing a user being provided upon a lack of capacity to return a mobility assistance device in the at least one receiving stall or lack of availability of mobility assistance devices for rental.

\* \* \* \* \*